Oct. 5, 1965

L. TUMERMAN ETAL 3,210,201

CONCENTRATED MILK PRODUCT

Filed May 14, 1962

Inventor
LEON TUMERMAN
JULES H. GUTH
By Soans, Anderson, Luedeka & Fitch
Attys 3,210,201
CONCENTRATED MILK PRODUCT
Leon Tumerman, Deerfield, and Jules H. Guth, Mount Prospect, Ill., assignors to National Dairy Products Corporation, New York, N.Y., a corporation of Delaware
Filed May 14, 1962, Ser. No. 194,370
8 Claims. (Cl. 99—192)

The present invention generally relates to milk products and, more particularly, it relates to a process for improving the low temperature stability of milk products and the stabilized products of such process.

For a long time, milk has been concentrated by removal of some portion of the water content thereof, and, of course, storage of the milk in concentrated form saves space, but there are certain problems connected therewith. In this connection, it is known to remove water from milk and to store concentrated milk at a sufficiently low temperature to retard development of bacteria therein and consequent deterioration thereof.

However, at the lower temperatures which tend to preserve the milk from bacteria development, deterioration of the milk tends to occur over a period of time. For example, it has been found that if milk is concentrated by removal of water to provide a solids content twice that of milk, the protein in the concentrated milk, if stored at 20° F., undergoes substantial protein changes. The concentrated milk, at such bacteria inhibiting storage temperatures, becomes unsatisfactory.

Accordingly, it is desirable to provide a process for treating concentrated milk so that it can be stored for long periods of time at a low enough temperature to inhibit bacterial development, while substantially retarding protein changes. Protein change, sometimes referred to as colloidal destabilization, is manifested in the milk by, among other characteristics, the development of a gel in the milk, which is undesirable.

If low temperature storage can be effected, milk processors can reduce storage losses of concentrated milk, and it would make available for sale more uniformly high quality concentrated milk.

Accordingly, it is a principal object of the present invention to provide improved low-temperature stable concentrated milk. It is also an object of the present invention to provide a process for improving the low temperature stability of concentrated milk. It is a further object of the present invention to provide a process for inhibiting or retarding colloidal destabilization of protein in concentrated milk at low storage temperatures.

Figure 1:
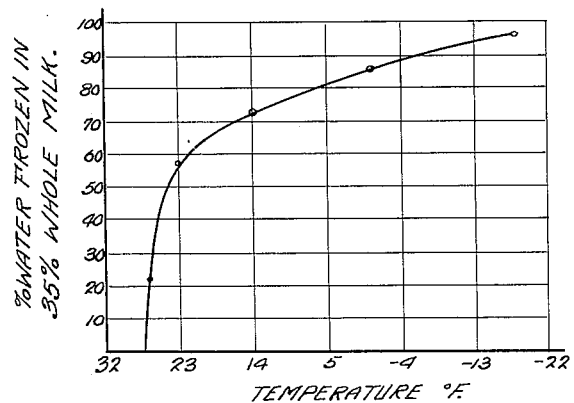
Figure 2:
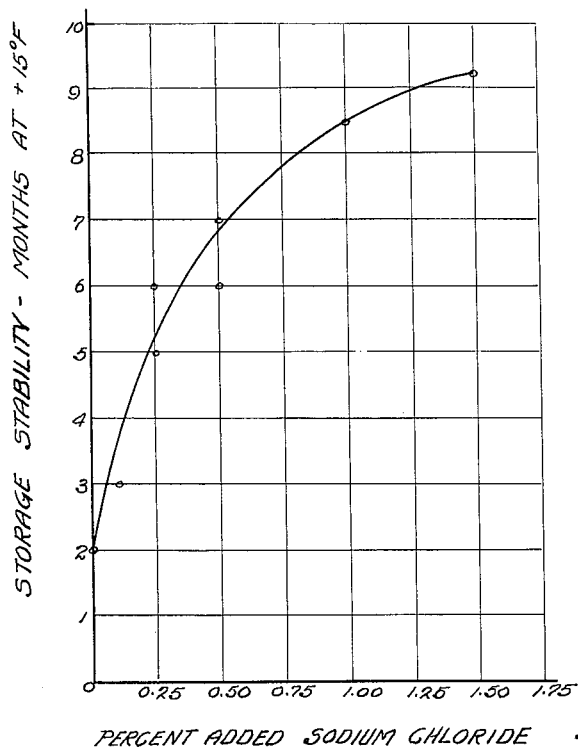

Further objects and advantages of the present invention will be apparent from a study of the following detailed description and the accompanying drawing in which:

FIGURE 1 is a graph indicating the percentage of water frozen in concentrated whole milk at various low temperatures; and FIGURE 2 is a graph illustrating the increase in storage stability effected by the addition of a salt to concentrated milk as a function of salt level, in accordance with the present invention.

The present invention generally comprises improving the low temperature stability of concentrated milk and dairy products including milk, such as flavored milk, by the addition of small amounts of freezing point-depressing solutes to the milk and/or dairy products.

It has been discovered that colloidal destabilization of protein in concentrated milk at low storage temperatures is in some manner related to the presence of high proportions of lactose with respect to the unfrozen water present. It is believed that there is a relationship between lactose concentration in the concentrated milk, with respect to the amount of water present in the unfrozen form, and the rate of colloidal destabilization of protein in the milk. It is further believed, although the present invention is not to be limited to such theory, that crystallization of lactose in the milk acts to promote colloidal destabilization of the proteins present in the milk.

In any event, it has been found that when freezing point depressing solutes are added to concentrated milk, the described colloidal destabilization of protein can be substantially inhibited. It appears that the mechanism of such inhibition is due to prevention of crystallization of substantial amounts of the lactose in the concentrated milk at a given low storage temperature.

For example, if cow's milk comprising approximately 87.1 percent water, 3.4 percent protein, 3.9 percent fat, 4.9 percent lactose, and 0.7 percent mineral matter is concentrated to a solids concentration of approximately 35 percent and a water concentration of approximately 65 percent, storage of the concentrated milk at 15° F. results in approximately 75 percent of the water freezing. The remainder of the water in the milk is not frozen, due to the presence of the naturally occurring dissolved materials. However, since 75 percent of the water in the concentrated milk is rendered unavailable for solubilizing the lactose present in the milk, the lactose is supersaturated and eventually crystallizes. As previously indicated, the crystallization of lactose appears to enhance colloidal destabilization of the protein present in the milk, causing deterioration of the milk. Accordingly, the utility of the concentrated milk becomes impaired within a relatively short period of time at frozen storage temperatures.

Now referring more particularly to FIGURE 1 of the accompanying drawings, a graph is presented for concentrated milk comprising 35 percent by weight total solids. The graph illustrates the amount of water which is in the frozen state in the milk at various temperatures. For example, it is seen that a temperature of about 15° F., approximately 70 percent of the water in the milk is in the frozen state. The remaining 30 percent of the water, i.e., the unfrozen water, is available for solubilization of lactose. Under these conditions, lactose is present in sufficient concentration to exceed its solubility in the unfrozen water.

The graph in FIGURE 1 further indicates that the percentage of water which is frozen increases with a decrease in temperature, but substantially levels out at approximately 90 percent when a temperature of approximately −15° F. is reached.

The process of the present invention, however, overcomes such difficulties by lowering the freezing point of the water in the milk to such an extent as to prevent freezing of a substantial proportion of the water. The freezing point-depressing solutes are added in an amount sufficient to depress the freezing point of the water enough to suppress crystallization of lactose so as to substantially inhibit colloidal destabilization of protein. If more freezing point-depressing solute is added to the concentrated milk, the amount of water freezing in the milk at a given storage temperature decreases further, and a point is reached where sufficient amounts of water remain in liquid form at the storage temperature to prevent substantial crystallization of lactose therefrom.

Accordingly, in accordance with the process of the present invention, an amount of freezing point-depressing solute is added to concentrated milk sufficient to inhibit lactose crystallization in the milk at the contemplated storage temperature of the milk.

In accordance with the process of the present invention a suitable edible freezing point-depressing solute may be added to the milk before or after concentration thereof. Such milk may be concentrated by low temperature evaporation, or any conventional method, usually in a manner which reduces or avoids the possibility of deterioration of the milk due to excessive heating, oxidation, etc.

Various considerations determine the selection of a desirable freezing point-depressing solute in particular situations. Obviously, the solute should not have a deleterious human physiological effect, and the flavor which it imparts to the milk product should not be unpalatable. Of equal importance is the effectiveness of the solute in lowering the freezing point of water. As is well-known to those skilled in the art, the effectiveness of a solute is related to the degree of dissociation of the solute in water, the number of units into which the solute dissociates and the molecular weight of the solute. Other factors being equal, a solute of low molecular weight is more effective than a solute of high molecular weight. Salts of alkali and alkaline earth metals are particularly effective as freezing point-depressing solutes. Examples of such salts which are particularly suitable for use in the practice of the present invention are sodium chloride, ammonium chloride and magnesium chloride. Sodium salts of various organic food acids are also effective, such as sodium formate, sodium lactate, and sodium propionate.

In accordance with the present invention, the level of freezing point-depressing solute is relatively low, so that the flavor imparted by the solute in the reconstituted milk product is normally slight. However, compensation for such flavor can be effected by including such flavoring materials as chocolate, fruit flavors and the like, if necessary.

Now referring more particularly to FIGURE 2 of the accompanying drawings, a graph is represented which illustrates the freezing point-depressing and storage life-increasing effects on concentrated milk achieved by the addition thereto of various concentrations of sodium chloride. The graph is based upon studies made using a 3:1 concentrated milk, that is, a milk concentrated to a point where the solids content was approximately 35 percent.

In this connection, the present invention is particularly applicable to milk concentrated 2½:1 or greater, that is, to a total solids concentration of 30 percent or more. At lesser concentrations, the need for freezing point-depressing solutes is not as necessary.

The extent of destabilization may be measured by the A.D.M.I. solubility test. In accordance with this test, the milk concentrate is reconstituted with water, and the volume of protein coagulum in 50 milliliters of the reconstituted milk is measured, after centrifugation. The volume of coagulum is the solubility index of the milk concentrate. A solubility index of 1.0 or more indicates that colloidal destabilization of the protein in the milk concentrate has occurred to an unacceptable degree.

The usual frozen storage life of a conventional 3:1 concentrated milk is only about 6 to 8 weeks. By the end of such time, colloidal destabilization of protein in the concentrated milk has proceeded to a solubility index of 1.0, at which point the milk is commercially undesirable. Substantially complete gelation (solubility index 10–12) occurs shortly thereafter.

However, applying the same standards of quality to the same type of concentrated milk to which sodium chloride solute was added, it was found that if sodium chloride was added to the concentrated milk in a concentration of about 1 percent, by weight of the concentrated milk, the storage life of the milk at 15° F. increased to 8½ months. When 0.5 percent sodium chloride was added, the storage life increased from 6 to 8 weeks to approximately 30 weeks, i.e., about 400 percent increase. Addition of 0.25 percent sodium chloride had the effect of extending the storage life of the milk to approximately 24 weeks or about 300 percent.

No difficulties were encountered in compensating for the salty flavor imparted to the milk by the added sodium chloride, in concentrations of up to 1 percent salt. Moreover, no difficulties were encountered connected with such sodium chloride addition, the quality of the concentrated milk remaining uniformly high throughout the test period, until colloidal destabilization of protein finally occurred.

The following examples further illustrate various features of the present invention.

EXAMPLE I

Pasteurized cow's milk having the following composition is concentrated under vacuum to a water content of approximately 65 percent at a temperature of 75° F.

*Milk composition before concentration*

| Constituent: | Percentage by weight |
|---|---|
| Water | 87.1 |
| Protein | 3.4 |
| Fat | 3.9 |
| Lactose | 4.9 |
| Mineral matter | 0.7 |
| Total solids | 12.9 |

The milk after concentration has a total solids content of 35 percent, and the lactose content is approximately 13.3 percent.

A batch of the concentrated milk is then treated by dissolving therein 0.25 percent by weight of sodium chloride. After the sodium chloride has been dissolved in the milk, the product is homogenized, and is again pasteurized. Thereafter, the milk is stored at 15° F. under the usual storage conditions and periodically examined for evidence of gelling. It is found that even after 20 weeks, the concentrated milk is of high quality with no visible gel formation. A comparable batch of concentrated milk having the same solids content but without added sodium chloride and stored at 15° F., has a solubility index of 1.0 or more after six weeks.

EXAMPLE II

Similar tests are performed using a milk concentrated to about a 3:1 ratio, having a lactose concentration of 14.7 percent and a total solids concentration of 38.7 percent. The concentrated milk is divided into two batches, one of which is left untreated and the other of which is treated with sodium formate in an amount of 0.5 percent, by weight of the milk. Both the treated and untreated samples of concentrated milk are stored at 15° F. and are periodically examined for visible gelling. After about 7 weeks visible gelling is detected in the untreated concentrated milk, while comparable gelling does not occur in the treated concentrated milk until after 25 weeks of storage. The treated concentrated milk before gelling does not exhibit a substantial flavor of sodium formate and also, in other respects, is of high quality.

The preceding examples clearly illustrate the effectiveness of the addition of small amounts of ionizing salts to concentrated milk. The particular concentration of ionizing salt to be added to extend the storage life of the concentrated milk will depend on the individual salt selected, the storage temperature, the degree to which the storage life is to be extended, and the degree of concentration of the milk, type of milk, etc.

With these considerations in mind, it is within the skill of one versed in the art to suitably select salt concentrations, type of salt, etc., depending upon the type of concentrated milk, contemplated storage temperatures, etc. to obtain maximum protection against storage coagulation.

The improved stable concentrated milk provided by the process of the present invention effects substantial savings due to decreased loss to processors of the milk and dairy products produced therefrom. Such stabilized milk is not deficient in any of the qualities normally provided by concentrated milk and, depending upon the added salt concentration, the type of salt, etc., may not even need additional flavoring to compensate for the salt flavor, if any, imparted by the salt to the milk.

Accordingly, an improved stable concentrated milk is provided by the process of the present invention. Such process and product employ simple means for effectively inhibiting lactose crystallization at the storage temperature of the milk. Colloidal destabilization of protein, believed to be caused by the crystallization of lactose, is thereby also inhibited. The process of the present invention is both simple and inexpensive and, as previously indicated, the product of the process has the described advantages without substantial disadvantages.

Various of the features of the present invention are set forth in the appended claims.

What is claimed is:

1. A process for improving the frozen storage stability of a concentrated milk product, which process comprises adding an edible non-toxic freezing point depressing solute to the milk product, freezing the milk product, and storing the milk product at a temperature above that temperature at which substantially all of the water in the milk product is frozen, said freezing point depressing solute being present in an amount sufficient to substantially inhibit lactose crystallization at said storage temperature, but insufficient to impart unpalatability to the reconstituted milk product.

2. A process for improving the frozen storage stability of a concentrated milk product, which process comprises adding an edible non-toxic freezing point depressing salt to the milk product, freezing the milk product, and storing the milk product at a temperature above that temperature at which substantially all of the water in the milk product is frozen, said freezing point depressing salt being present in an amount sufficient to substantially inhibit lactose crystallization at said storage temperature, but insufficient to impart unpalatability to the reconstituted milk product, the concentrated milk product being at least about a 2½:1 concentrate.

3. A process for improving the frozen storage stability of a concentrated milk product, which process comprises adding an edible non-toxic freezing point depressing ionizing salt to the milk product, freezing the milk product, and storing the milk product at a temperature above that temperature at which substantially all of the water in the milk product is frozen, said freezing point depressing salt being present in an amount sufficient to substantially inhibit lactose crystallization at said storage temperature, but insufficient to impart unpalatability to the reconstituted milk product, the concentrated milk product being at least about a 2½:1 concentrate.

4. A process for improving the low temperature storage stability of concentrated milk, which process comprises adding an edible non-toxic ionizing salt equivalent in freezing point-depressing effects to the addition of between about 0.25 percent and about 1 percent by weight of sodium chloride to concentrated milk comprising about 35 weight percent solids, freezing the concentrated milk, and storing the concentrated milk at a temperature above that temperature at which all of the water in the concentrated milk is frozen, whereby the storage life of the concentrated milk at sub-freezing temperatures is increased.

5. A process for improving the frozen storage stability of concentrated milk, which process comprises concentrating cow's milk to a solids content between about 30 percent and about 40 percent by weight, adding to the concentrated milk sodium chloride in an amount of between about 0.25 percent and about 1 percent, by weight of the concentrated milk, freezing the concentrated milk, and storing the milk product at a temperature above that temperature at which all of the water in the milk product is frozen.

6. An improved frozen concentrated milk product, which product includes an edible non-toxic freezing point depressing solute at a level whereat sufficient water remains unfrozen in the concentrated milk product at the storage temperature to solubilize the lactose contained in the frozen concentrated milk product, but insufficient to impart unpalatability to the reconstituted milk product.

7. An improved frozen concentrated milk product having a solids content between about 30 percent and about 40 percent by weight, and having an added concentration of sodium chloride of at least about 0.25 percent and less than about 1.0 percent by weight.

8. An improved frozen concentrated milk having a solids content of about 35 percent by weight, and having an added sodium chloride concentration of at least about 0.25 percent and less than about 1.0 percent by weight.

References Cited by the Examiner

UNITED STATES PATENTS

| 1,749,153 | 3/30 | O'Connor | 99—55 |
| 1,964,279 | 6/34 | Webb | 99—192 X |
| 2,142,864 | 1/39 | Williams | 99—151 X |
| 2,490,599 | 12/49 | Otting | 99—55 |

OTHER REFERENCES

Babcock et al.: J. Dairy Science, February 1949, pp. 175–182.

Hunzicker: "Condensed Milk and Milk Powder," Publ. by Author, La Grange, Ill., 1949, p. 36.

Tumerman et al.: J. Dairy Science, July 1954, pp. 830–839.

A. LOUIS MONACELL, *Primary Examiner*.

ABRAHAM H. WINKELSTEIN, *Examiner*.